United States Patent
Sasada et al.

(10) Patent No.: US 9,912,935 B2
(45) Date of Patent: Mar. 6, 2018

(54) STEREO CAMERA DEVICE

(71) Applicant: Hitachi Automotive Systems, Ltd., Hitachinaka-shi, Ibaraki (JP)

(72) Inventors: Yoshiyuki Sasada, Hitachinaka (JP); Satoshi Yamazaki, Hitachinaka (JP); Ken Ohsumi, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 465 days.

(21) Appl. No.: 14/420,382

(22) PCT Filed: Jul. 26, 2013

(86) PCT No.: PCT/JP2013/070270
§ 371 (c)(1),
(2) Date: Feb. 9, 2015

(87) PCT Pub. No.: WO2014/050282
PCT Pub. Date: Apr. 3, 2014

(65) Prior Publication Data
US 2015/0215606 A1     Jul. 30, 2015

(30) Foreign Application Priority Data

Sep. 27, 2012  (JP) .................... 2012-213387

(51) Int. Cl.
*H04N 13/02*     (2006.01)
*G03B 35/08*     (2006.01)
*H04N 5/225*     (2006.01)

(52) U.S. Cl.
CPC ......... *H04N 13/0239* (2013.01); *G03B 35/08* (2013.01); *H04N 5/2252* (2013.01); *H04N 5/2253* (2013.01); *H04N 13/0296* (2013.01)

(58) Field of Classification Search
CPC ................................................. H04N 13/0239
See application file for complete search history.

(56) References Cited

U.S. PATENT DOCUMENTS 9,204,041 B1 * 12/2015 Campbell .......... H04N 13/0296
2007/0296846 A1 * 12/2007 Barman ............... H04N 5/2252
                                                            348/340

(Continued)

FOREIGN PATENT DOCUMENTS

JP      11-237684 A     8/1999
JP      2006-33346 A    2/2006

(Continued)

OTHER PUBLICATIONS

International Search Report (PCT/ISA/210), dated Sep. 10, 2013 with English-language translation (Four (4) pages).

*Primary Examiner* — James Pontius
(74) *Attorney, Agent, or Firm* — Crowell & Moring LLP

(57) ABSTRACT

To provide a stereo camera device capable of maintaining performance and reliability, while realizing thickness reduction, provided are a first image pickup device, a first communication connection unit to output a first image captured with the first image pickup device, a first image pickup substrate where the first image pickup device and the first communication connection unit are provided, a second image pickup device, a second communication connection unit to output a second image captured with the second image pickup device, a second image pickup substrate where the second image pickup device and the second communication connection unit are provided, and a housing where the first image pickup substrate is provided at one end and the second image pickup substrate is provided at another end. In the first image pickup substrate, the first image pickup device and the first communication connection unit are provided in parallel with each other in a lengthwise direction of the housing. In the second image pickup substrate, the second image pickup device and the second communication connection unit are provided in parallel with each other in the lengthwise direction of the housing. The (Continued)

first image pickup substrate and the second image pickup substrate are symmetrically provided.

14 Claims, 5 Drawing Sheets

(56) References Cited

U.S. PATENT DOCUMENTS

2008/0001727 A1\* 1/2008 Ohsumi ................ B60R 11/04
                                                                340/436
2012/0257024 A1   10/2012 Inaba

FOREIGN PATENT DOCUMENTS

| JP | 2006-101154 A | 4/2006 |
| JP | 2008-306350 A | 12/2008 |
| JP | 2011-123078 A | 6/2011 |
| JP | 2012-173737 A | 9/2012 |
| WO | WO 2011/068139 A1 | 6/2011 |

\* cited by examiner

LEFT IMAGE DIAGRAM    RIGHT IMAGE DIAGRAM

STEREO CAMERA DEVICE

TECHNICAL FIELD

The invention relates to a stereo camera device in which plural image pickup devices are mounted.

BACKGROUND ART

Application of a stereo camera device, which calculates a distance to an object using a pair of images obtained with two image pickup means and performs recognition of the object based on the distance, to an on-vehicle system and the like to assist safe running of a vehicle is being increased.

Stereo image processing utilized in these systems is obtaining the distance by applying trigonometrical survey technique to a pair of images captured with a positional interval therebetween. Generally, the device to realize this operation has a pair of image pickup means, and a stereo image processing LSI to perform trigonometrical survey processing on a pair of images outputted from these image pickup means (Patent Literature 1).

As this image processing camera is mounted on a vehicle front glass, it is required not to disturb a driver's view and to be located in a wiper area, as conditions. Further, downsizing, especially thickness reduction, is required of the camera.

As a device to realize the thickness reduction related to an image processing system using one camera, Patent Literature 2 or the like is known.

CITATION LIST

Patent Literature

Patent Literature 1: Japanese Unexamined Patent Application Laid-Open No. Hei 11-237684
Patent Literature 2: Japanese Unexamined Patent Application Laid-Open No. 2008-306350

SUMMARY OF INVENTION

Technical Problem

To obtain similar effects, by using one camera as in the case of the Patent Literature 2, as a stereo camera using two or more cameras, it is necessary to attain a structure for matching between left and right images and to contrive usage of the image pickup devices to avoid degradation of the performance.

In view of such problem, the present invention has an object to provide a stereo camera device capable of maintaining performance and reliability while realizing thickness reduction.

Solution to Problem

To obtain the above problem, a stereo camera device according to the present invention comprises: a first image pickup device; a first communication connection unit that outputs a first image captured with the first image pickup device; a first image pickup substrate where the first image pickup device and the first communication connection unit are provided; a second image pickup device; a second communication connection unit that outputs a second image captured with the second image pickup device; a second image pickup substrate where the second image pickup device and the second communication connection unit are provided; and a housing where the first image pickup substrate is provided at one end while the second image pickup substrate is provided at another end, wherein in the first image pickup substrate, the first image pickup device and the first communication connection unit are provided in parallel with each other in a lengthwise direction of the housing, and in the second image pickup substrate, the second image pickup device and the second communication connection unit are provided in parallel with each other in the lengthwise direction of the housing, further wherein the first image pickup substrate and the second image pickup substrate are symmetrically provided.

Further, it comprises: a first image pickup device; a first communication connection unit that outputs a first image captured with the first image pickup device; a first image pickup substrate where the first image pickup device and the first communication connection unit are provided; a second image pickup device; a second communication connection unit that outputs a second image captured with the second image pickup device; a second image pickup substrate where the second image pickup device and the second communication connection unit are provided; and a housing where the first image pickup substrate is provided at one end while the second image pickup substrate is provided at another end, wherein in the first image pickup substrate, the first image pickup device and the first communication connection unit are provided in parallel with each other in a lengthwise direction of the housing, and wherein in the second image pickup substrate, the second image pickup device and the second communication connection unit are provided in parallel with each other in the lengthwise direction of the housing, further wherein the first image pickup substrate and the second image pickup substrate are point-symmetrically provided.

Advantageous Effects of Invention

According to the present invention, it is possible to provide a stereo camera device capable of maintaining performance and reliability while realizing thickness reduction.

DESCRIPTION OF EMBODIMENTS

Hereinbelow, embodiments will be described using the drawings.

An example of a stereo camera device according to the present invention will be described using FIG. 1 to FIG. 9.

Figure 1:
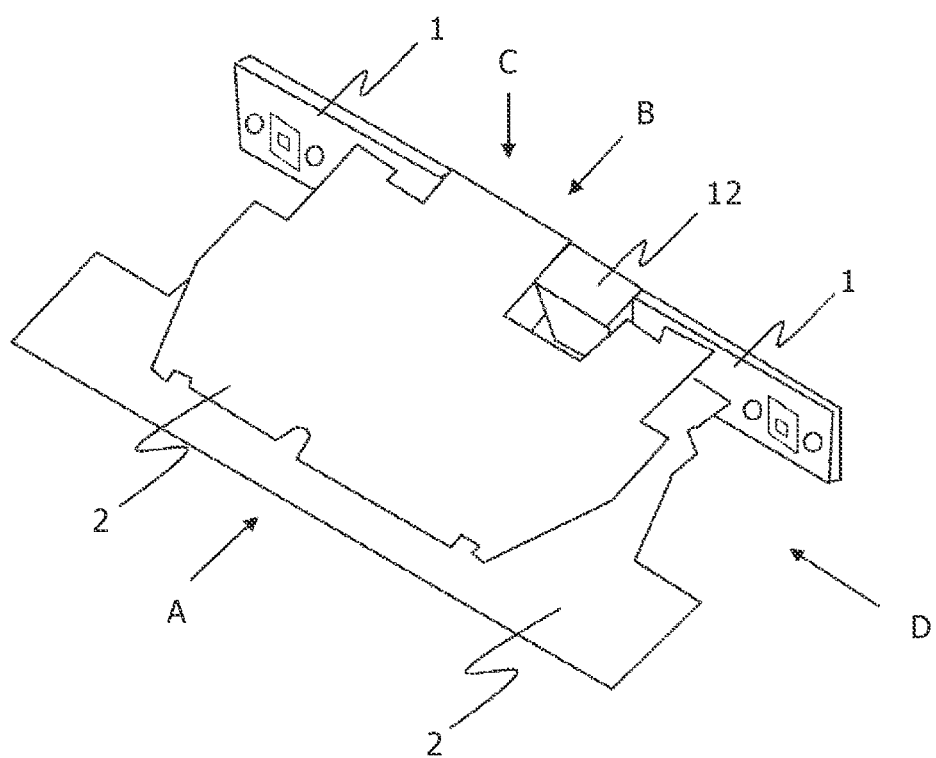
FIG. 1 is a diagram showing arrangement of image pickup substrates and main substrates of a stereo camera device according to the present invention.
Figure 2:
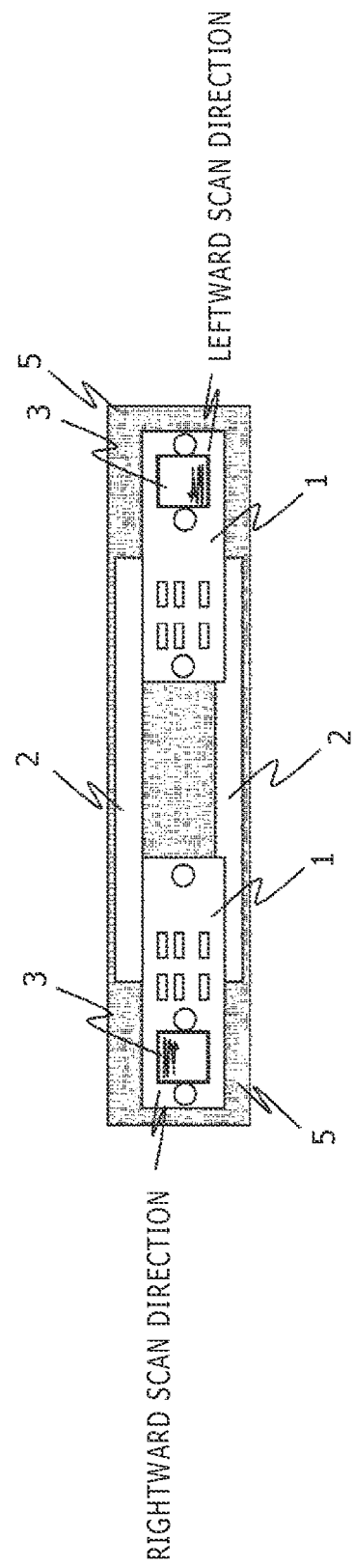
FIG. 2 is a diagram showing the stereo camera device viewed from a direction A in FIG. 1.
Figure 3:
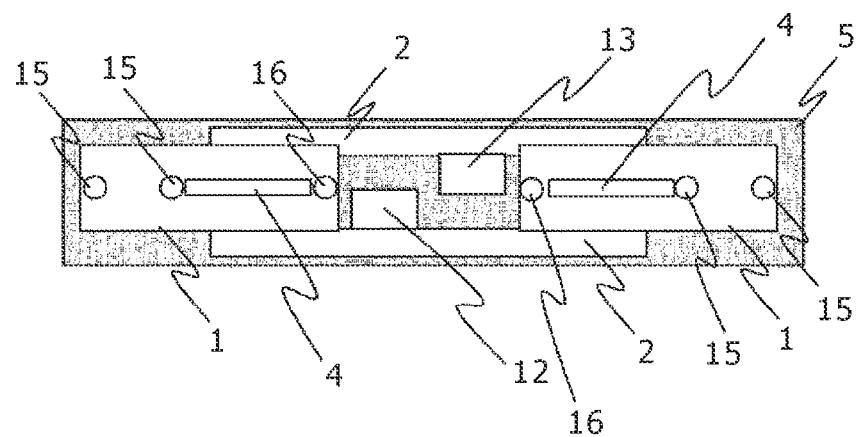
FIG. 3 is a diagram showing the stereo camera device viewed from a direction B in FIG. 1.
Figure 4:
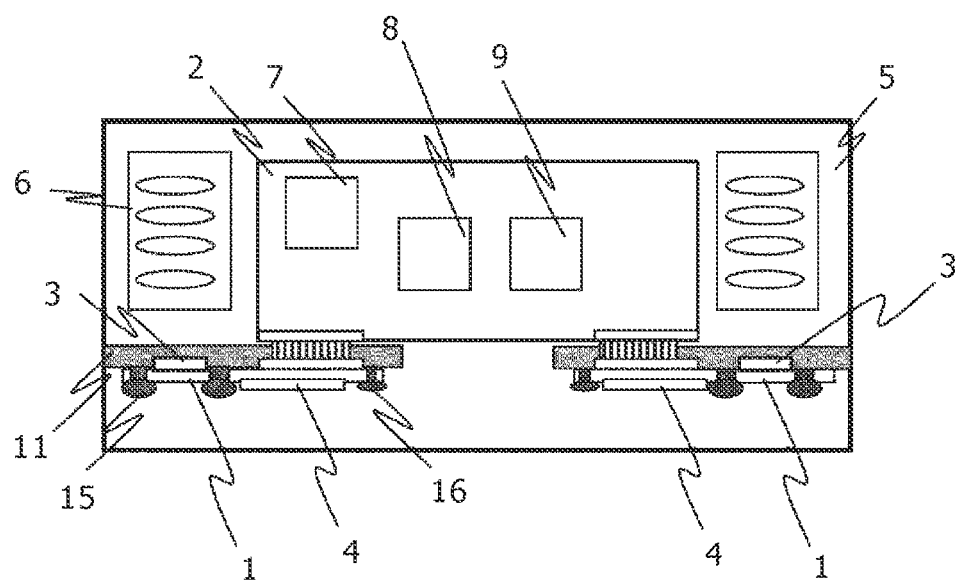
FIG. 4 is a diagram showing the stereo camera device viewed from a direction C in FIG. 1.
Figure 5:
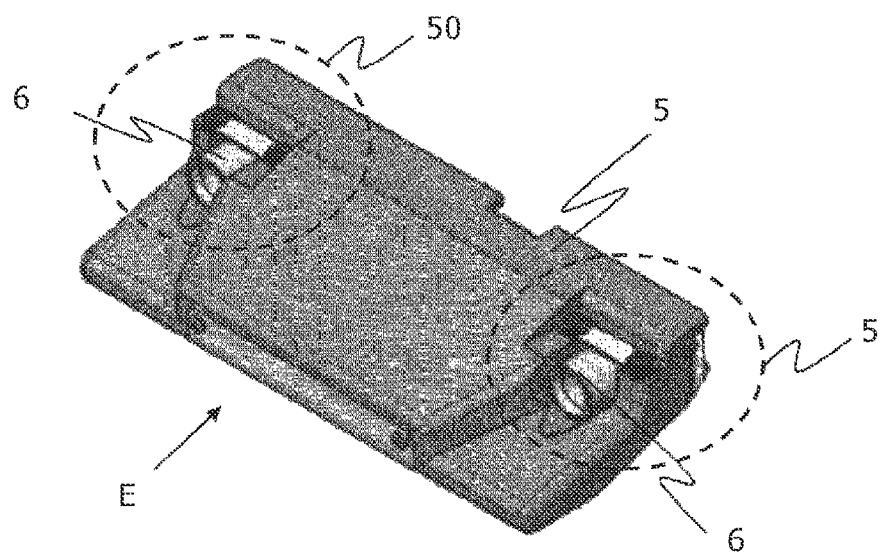
FIG. 5 is a diagram showing the overview of an embodiment of the stereo camera device according to the present invention.
Figure 7:
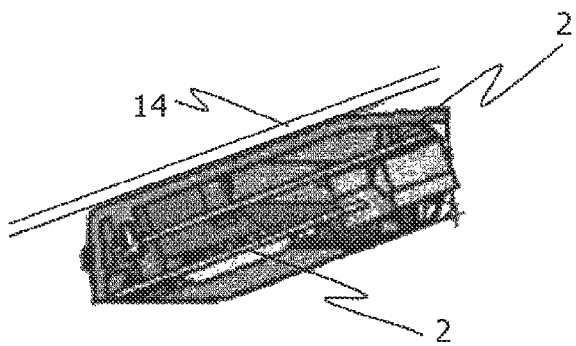
FIG. 7 is a diagram showing the stereo camera device viewed from a direction D in FIG. 1.
Figure 8:
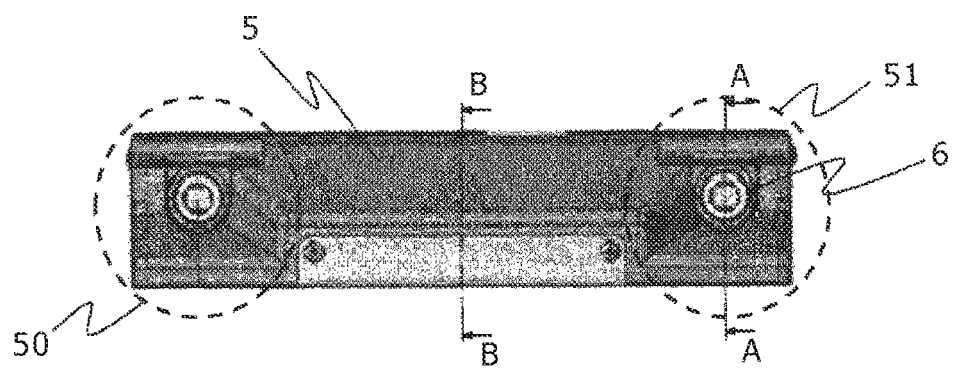
FIG. 8 is a diagram showing the stereo camera device viewed from a direction E in FIG. 5.
Figure 9:
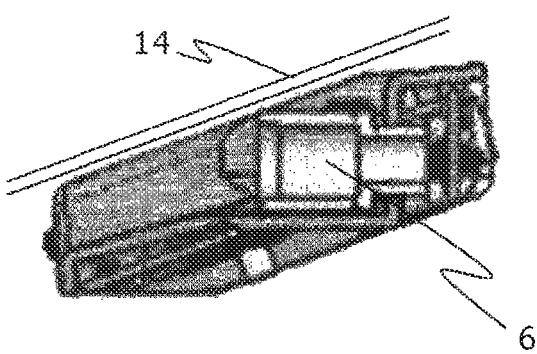
FIG. 9 is a diagram showing a cross section of the stereo camera device between A-A in FIG. 8.

FIG. 5 is a diagram showing an overview of the stereo camera device according to the present invention. FIG. 1 shows the internal structure. The diagram shows two image pickup substrates 1 (a first image pickup substrate and a second image pickup substrate), and two main substrates 2 (a first main substrate and a second main substrate). Note that FIG. 2 shows a diagram viewed from a direction A in FIG. 1; FIG. 3 shows a diagram viewed from a direction B; FIG. 4 shows a diagram viewed from a direction C; and FIG. 7 shows a diagram viewed from a direction D. FIG. 8 shows a diagram viewed from a direction E in FIG. 5; and FIG. 9 shows a cross-sectional diagram between A-A in FIG. 8. Note that FIG. 7 is also a cross-sectional diagram between B-B in FIG. 8.

As shown in FIG. 5, the stereo camera device has a first image pickup unit 50 (left image pickup unit), a second image pickup unit 51 (right image pickup unit), and a case 5 as a housing in which the first image pickup unit 50 is provided at one end while the second image pickup unit 51 is provided at the other end. Based on images captured with the first image pickup unit 50 and the second image pickup unit 51, a parallax is calculated and a distance image is generated. Based on the distance image, an object in front of the vehicle is recognized. At this time, it is possible to improve recognition accuracy by arranging the elements such that the optical axis of the first image pickup unit 50 and the optical axis of the second image pickup unit 51 are parallel with each other.

As shown in FIG. 2 and FIG. 3, in the stereo camera device according to the embodiments, two image pickup substrates 1 (a first image pickup substrate (left image pickup substrate) and a second image pickup substrate (right image pickup substrate)), having two image pickup devices 3 (a first image pickup device (left image pickup device) and a second image pickup device (right image pickup device)) and communication connection units 4 (a first communication connection unit and a second communication connection unit) to output images captured with the image pickup devices 3 to the outside of the device, are provided in the case 5. The two image pickup substrates 1 are provided symmetrically with respect to the center of the case as a housing. In each image pickup substrate 1, the communication connection unit 4 is provided in parallel with the left or right of the image pickup device 3, that is, it is provided in parallel with a lengthwise direction of the case 5 as a housing. A main connector 12 (first connection unit) and a main connector 13 (second connection unit) as connection units for connection to two main substrates 2 (a first main substrate (power source substrate) and a second main substrate (signal processing substrate)) are provided between the two image pickup substrates 1. The two main substrates 2 are overlaid in a thickness direction of the stereo camera device.

In this manner, as the image pickup devices 3 and the communication connection units 4 are provided in parallel on one image pickup substrate 1, it is possible to reduce the thickness of the stereo camera device, and it is possible to realize thickness reduction of the stereo camera device. In the present embodiment, the thickness is set as a margin of the image pickup device 3 and the image pickup substrate 1 and the case 5, however, ideally, it is possible to reduce the thickness to the thickness of the image pickup device 3.

FIG. 4 is a diagram viewed from a direction C in FIG. 1. As shown in the figure, lenses 6 are provided in front of (in an image pickup direction) the image pickup devices 3, and the two main substrates 2 are overlaid therebetween. In FIG. 4, in the main substrates 2, a power source unit 7, a video processing unit 8, and a recognition processing unit 9 are provided on one main substrate. It is possible to realize improved noise reduction by separating the substrates as a power source system and a signal processing system by providing the power source unit 7 on the first main substrate, while providing the video processing unit 8 and the recognition processing unit 9 on the second main substrate. Further, the surface of the first main substrate where the power source unit 7 is provided and the surface of the second main substrate where the video processing unit 8 and the recognition processing unit 9 are provided are arranged to be opposite to each other.

The flow of signals will be described using FIG. 4. The external information is captured through the lenses 6 as captured images into the image pickup devices 3, and the captured image signals are transmitted via the communication connection units 4 to the main substrates 2. The main substrates 2 have the power source unit 7, the video processing unit 8, and the recognition processing unit 9. The image signals from the image pickup substrates 1 are first subjected to optical correction with the video processing unit 8. Further, stereo matching processing is performed to obtain three dimensional information (hereinafter, a parallax image). Extraction of information necessary for the recognition processing unit 9 is performed using these corrected images and the parallax image, and a recognition object is recognized.

Note that the two image pickup devices 3 are provided outside the image pickup substrates 1 with respect to the position of center of gravity of the stereo camera device, or the center of the case 5 as a housing, and the communication connection units 4 are provided inside the image pickup substrates 1, i.e., symmetrically provided with respect to the position of center of gravity. Accordingly, the distance between the two image pickup devices 3, i.e., the length of the base length is the longest in the case 5, and the parallax value calculated in the stereo camera device is a great value. It is possible to ensure the performance while realizing thickness reduction.

Figure 6:
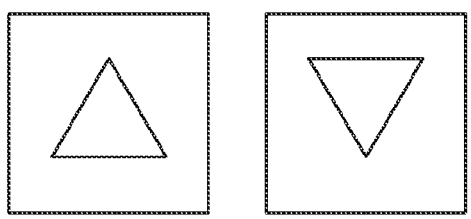
FIG. 6 is a diagram explaining left and right image screens when the image pickup substrates are point-symmetrically mounted.

Further, it may be arranged such that the two image pickup substrates 1, as the same substrate, are point-symmetrically provided. In this case, it is not necessary to manufacture two types of image pickup substrates 1, it is advantageous in the point of mass production management. Note that the captured images are laterally inverted as shown in FIG. 6 since the image pickup substrates are point-symmetrically provided. Without any processing, it is not possible to extract corresponding points in the left and right images upon stereo matching with the video processing unit 8. Accordingly, any one of the left and right image signals is rotated at 1800 so as to ensure the performance. The rotating processing is performed with any one of the image pickup devices 3, the video processing unit 8 and the recognition processing unit 9.

Further, when the image pickup devices 3 are driven under rolling shutter control, the scan directions and reading start pixels of the left and right image pickup devices 3 are different as shown in FIG. 2. In FIG. 2, the scan direction of the first image pickup device (left image pickup device) is rightward, while the scan direction of the second image pickup device (right image pickup device) is leftward. It is not possible to extract corresponding points in the left and right images due to the same problem as described above. Accordingly, it is possible to ensure the performance by setting the scan directions and the reading start pixels of the left and right image pickup devices 3 to the same position.

Next, the arrangement of the main substrates 2 will be described. As shown in FIGS. 2 to 4, it is possible to realize thickness reduction by arranging the power source substrate and the signal processing substrate as the main substrates 2 in parallel in the thickness direction of the case 5 between the two image pickup substrates 1.

Further, it is possible to facilitate handling of the image pickup substrates 1 at the time of production by using any of the communication connection units 4 as described above as a connector, and using the image pickup substrates 1 and the main substrates 2 which are soft substrates such as FPC.

Further, it can be said that the structure has excellence in stabled relative positional relation between the left and right image pickup devices 3, since on the both sides of any of the above-described image pickup devices 3, thermal expansion of the left and right image pickup substrates 1 occurs from a low temperature to a high temperature as vehicle environment, mainly in the image pickup devices 3, by fixing the image pickup substrate 1 to a fixing tool 11 with a screw A15. In FIG. 3, the screw A15 is described as first fixing means, however, the fixing means is not selected. Further, in FIG. 3, the fixing position is on horizontal both sides of the image pickup device 3, however, it may be on vertical both sides. Note that it is possible to suppress degradation of the accuracy of the parallax image by using the same fixing means as left and right fixing means, and further, setting the fixing position symmetrically in the left and right image pickup substrates 1.

Further, as shown in FIG. 4, it is possible to hold the image pickup substrate 1 in a further stable manner by providing the communication connection unit 4 on the side opposite to the side where the image pickup device 3 is provided, with respect to the image pickup substrate 1, and fixing the communication connection unit to the fixing tool 11. As the position of the communication connection unit is away from the center of the image pickup device 3, shift of the center of the image pickup substrate 1 from the center of the image pickup device 3 due to thermal expansion is prevented. Accordingly, the structure has excellence in ensuring the performance.

Further, in FIG. 4, the image pickup substrate 1 is fixed to the fixing tool 11 by fixing the inner part of the image pickup substrate 1 with a screw B16 as second fixing means, however, the fixing means is not selected. Further, regarding the fixing force of the screw B16 (second fixing means), since fixing is performed with the screw B16 with a smaller force than the fixing force of the screw A15 (first fixing means) on the both sides of the image pickup device 3, shift of the center of the image pickup substrate 1 from the center of the image pickup device 3 due to thermal expansion is further prevented. Accordingly, the structure has excellence in ensuring the performance.

Further, the fixing tool 11 in FIG. 4 may be a metal plate. In this case, the image pickup substrate 1 has a slim shape. The substrate is fixed to the metal plate, to improve vibration proof property. Accordingly, the structure has excellence in ensuring the reliability while realizing thickness reduction.

Further, in FIG. 3, the number of the main substrates 2 is two or more, and provided with at least one connector as a connection unit from each substrate. One main substrate 2 has the main connector 12 as the power-source related first connection unit, and the other main substrate 2 has the main connector 13 as the video-related second connection unit. In the power-source related connection unit, the noise is large, and the video-related connection unit, in which the large amount of signals from the image pickup devices 3 are communicated at a high speed, is week to noise. Accordingly, it is possible to ensure the performance by means of separate mounting. The structure has excellence in ensuring reliability while realizing thickness reduction by providing the main connector 12 and the main connector 13 in a nested form.

Further, as shown in FIG. 7, the structure has excellence in realizing thickness reduction with respect to the distance from the window upon mounting in a vehicle by providing the main substrates 2 in approximately parallel with a vehicle window 14. In the case of the present embodiment having the two main substrates 2, it is possible to realize thinning by providing the two main substrates 2 in approximately parallel with the vehicle window 14. Since not one main substrate 2 but two main substrates 2 are overlaid in the thickness direction, it is possible to reduce the length in the lengthwise direction of the stereo camera device in comparison with a case where one main substrate 2 is used. Note that as shown in FIG. 9, the lens 6 is set, not in parallel with the vehicle window 14, but in approximately parallel with the road surface so as to be directed to a vehicle frontward direction.

LIST OF REFERENCE SIGNS

1: image pickup substrate
2: main substrate
3: image pickup device
4: communication connection unit
5: case
6: lens
7: power source unit
8: video processing unit
9: recognition processing unit
11: fixing tool
12: main connector
13: main connector
14: vehicle window
15: screw A
16: screw B

The invention claimed is:
1. A stereo camera device comprising:
a first image pickup device;
a first communication connection unit that outputs a first image captured with the first image pickup device;
a first image pickup substrate where the first image pickup device and the first communication connection unit are provided;
a second image pickup device;
a second communication connection unit that outputs a second image captured with the second image pickup device;
a second image pickup substrate where the second image pickup device and the second communication connection unit are provided; and
a housing where the first image pickup substrate is provided at one end and the second image pickup substrate is provided at another end,
wherein in the first image pickup substrate, the first image pickup device and the first communication connection unit are provided in parallel with each other in a lengthwise direction of the housing, wherein in the second image pickup substrate, the second image pickup device and the second communication connection unit are provided in parallel with each other in the lengthwise direction of the housing, wherein the first image pickup substrate and the second image pickup substrate are symmetrically provided, and wherein two main substrates are arranged spaced apart in a thickness direction in the housing, where at least one of a signal processing unit to process the first image and/or the second image is provided on one of the two main substrates, and a power source unit to supply power source to the signal processing unit is provided on the other of the two main substrates.

2. The stereo camera device according to claim 1, wherein the first image pickup device and the second image pickup device are provided on the outside with respect to the center of the housing, and the first communication connection unit and the second communication connection unit are provided on the inside with respect to the center of the housing.

3. The stereo camera device according to claim 1, further comprising:
a processing substrate as a main substrate where a signal processing unit to perform image processing on the first image or the second image is provided; and
a first connection unit connected to the processing substrate, wherein the first connection unit is provided between the first image pickup substrate and the second image pickup substrate.

4. The stereo camera device according to claim 3, further comprising:
a power source substrate as a main substrate where a power source unit to supply power source is provided; and
a second connection unit connected to the power source substrate,
wherein the second connection unit is provided between the first image pickup substrate and the second image pickup substrate.

5. The stereo camera device according to claim 4, wherein a surface of the processing substrate where the signal processing unit is provided and a surface of the power source substrate where the power source unit is provided are arranged to be opposite to each other.

6. A stereo camera device comprising:
a first image pickup device;
a first communication connection unit that outputs a first image captured with the first image pickup device;
a first image pickup substrate where the first image pickup device and the first communication connection unit are provided;
a second image pickup device;
a second communication connection unit that outputs a second image captured with the second image pickup device;
a second image pickup substrate where the second image pickup device and the second communication connection unit are provided; and
a housing where the first image pickup substrate is provided at one end and the second image pickup substrate is provided at another end,
wherein in the first image pickup substrate, the first image pickup device and the first communication connection unit are provided in parallel with each other in a lengthwise direction of the housing,
wherein in the second image pickup substrate, the second image pickup device and the second communication connection unit are provided in parallel with each other in the lengthwise direction of the housing,
wherein the first image pickup substrate and the second image pickup substrate are point-symmetrically provided, and
wherein one of an image signal obtained from the first image pickup device and an image signal obtained from the second image pickup device is rotated by 180 degrees, and the rotated image signal is used.

7. The stereo camera device according to claim 6, wherein the first image pickup substrate and the second image pickup substrate are identical in substrate type.

8. The stereo camera device according to claim 7, wherein the first image pickup device and the second communication connection unit are provided on the outside with respect to the center of the housing, and
wherein the second image pickup device and the first communication connection unit are provided on the inside with respect to the center of the housing.

9. The stereo camera device according to claim 6, wherein in the first image pickup device and the second image pickup device, when driven under rolling shutter control, scan directions and reading start pixels of the first image pickup device and the second image pickup device are set to the same position.

10. The stereo camera device according to claim 1, wherein the first image pickup substrate and the second image pickup substrate are fixed to a fixing tool from both sides of the first image pickup device and the second image pickup device.

11. The stereo camera device according to claim 10, wherein a first fixing means for fixing to the fixing tool fixes the first image pickup device and the second image pickup device in symmetric positions with respect to a center.

12. The stereo camera device according to claim 10, wherein a second fixing means performs fixing to the fixing tool in an inner part of the first image pickup substrate and the second image pickup substrate with respect to a center of the housing.

13. The stereo camera device according to claim 11, wherein a second fixing means performs fixing to the fixing tool in an inner part of the first image pickup substrate and the second image pickup substrate with respect to the center of the housing, and
wherein a fixing force of the second fixing means is smaller than a fixing force of the first fixing means.

14. The stereo camera device according to claim 10, wherein the fixing tool is a metal plate.

* * * * *